Dec. 1, 1959          D. L. JOHNSON          2,914,957
TRAINING MECHANISM FOR BELT SYSTEMS
Filed Nov. 13, 1956
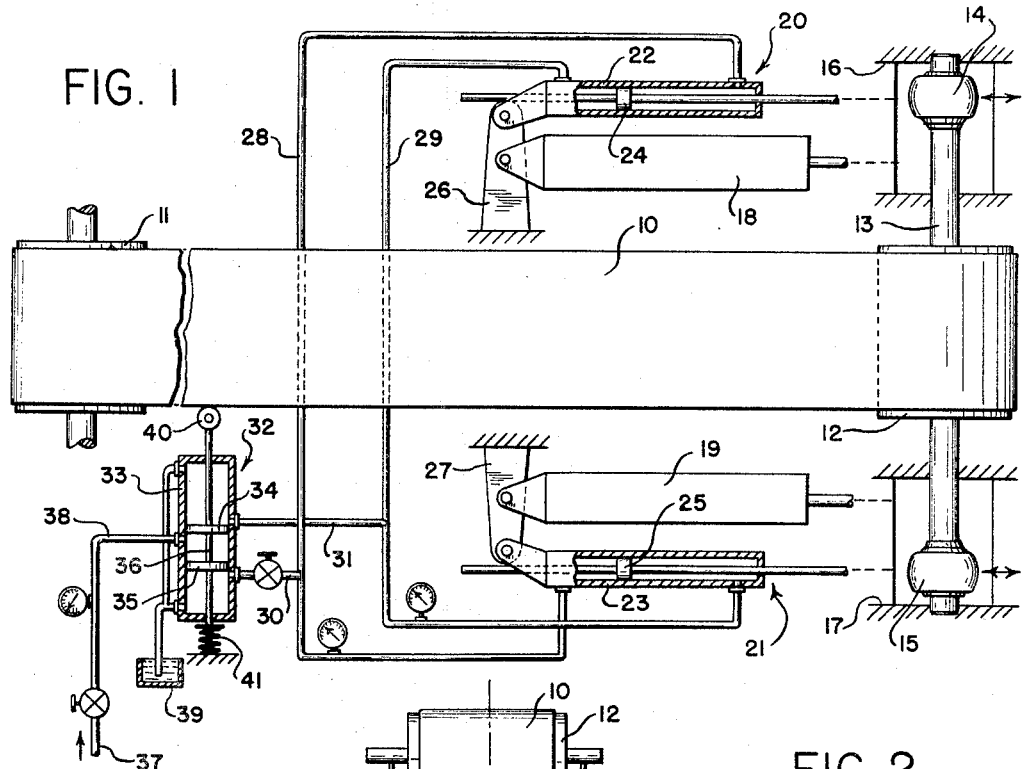
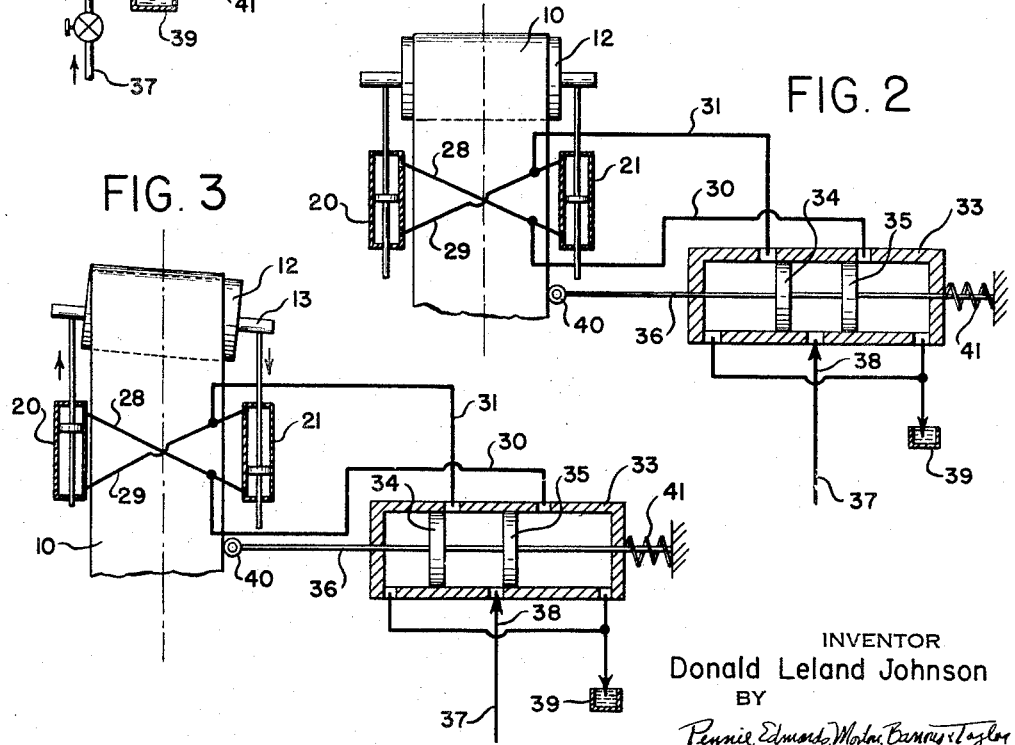
INVENTOR
Donald Leland Johnson
BY
*Pennie, Edmonds, Morton, Barrows & Taylor*
ATTORNEYS United States Patent Office 2,914,957
Patented Dec. 1, 1959

2,914,957

TRAINING MECHANISM FOR BELT SYSTEMS

Donald Leland Johnson, Tacoma, Wash., assignor to Rayonier Incorporated, Shelton, Wash., a corporation of Delaware Application November 13, 1956, Serial No. 621,594

7 Claims. (Cl. 74—241)

This invention relates to belt systems, and more particularly to an improved mechanism in combination with a belt system for maintaining the belt in proper alignment with the pulleys or rollers over which the belt travels.

In belt systems utilizing flat bands or belts, provision must be made for maintaining the belt properly trained about the rollers of the system. Thus, many conventional belt systems employ such common expedients as crowned pulleys, for example, which tend to maintain the belt in proper alignment in the system. However, in systems wherein the belts, especially wide belts, are maintained under substantial tension, the problem of maintaining the belt properly trained about the rollers becomes increasingly difficult, and conventional arrangements are not satisfactory. This is particularly true in cases where metal belts are employed and it is necessary or desirable to maintain the belts aligned in the system within relatively close tolerance limits. In accordance with this invention, an improved belt training mechanism is provided which accurately and effectively maintains a running belt in a desired alignment with respect to the pulleys or rollers over which it travels.

Although the invention is not thus restricted, it has special advantages when used in combination with a belt system wherein a metal belt is maintained under great tension. Specifically, the apparatus of the invention may be advantageously used with a high-pressure continuous belt press of the type described in my copending application, Serial No. 632,395, filed January 3, 1957. In the apparatus of my copending application, wide steel belts, varying, say, from two to six feet in width, are operated under stresses exceeding 85,000 p.s.i. and at lineal speeds up to 100 ft./min. Even very small mis-alignment can either limit the practical working tension or result in injury if higher tensions are used. The apparatus of the present invention is ideally suited for use in a system such as that described; but it should be understood that the invention may be used in a variety of belt systems, such, for example, as conveyor and transmission systems.

This invention provides an improved training mechanism, in combination with a belt system where the belt is maintained under tension, by means of which one of the rollers of the system over which the belt travels may be tipped or skewed, to correct the alignment of the belt, without substantially affecting the working tension of the belt.

More specifically, the invention provides a belt training system in which one of the rollers of the system is supported by means permitting a limited movement of the roller shaft or axle. The adjustable roller is also operatively connected to actuator means which operate, when the belt moves out of proper alignment, to tilt or skew the roller on its shaft about a point intermediate its ends, causing the belt to return toward its initial position. The slight increase in tension at one edge of the belt resulting from training is accompanied by a reduction in the tension at the other edge of the belt, so that overall the belt tension remains substantially the same.

Another specific feature of the invention resides in the provision of a belt training mechanism of the general type described above which includes an improved automatic control arrangement. The control includes a four-way valve device operable in accordance with the position of the belt edge to energize the roller tilting actuators in the proper direction. The new arrangement is of a simplified nature, but permits of the sensitive and accurate regulation of the belt position.

For a better understanding of the invention, reference should be made to the following detailed description and accompanying drawings, in which:

Fig. 1 is a simplified plan view of apparatus in accordance with the invention;

Fig. 2 is a schematic representation of the apparatus of Fig. 1; and

Fig. 3 is another schematic represenation of the apparatus of Fig. 1, illustrating the manner in which the apparatus is actuated for correcting the alignment of a belt.

As shown in the drawings, the belt 10 is trained about a pair of spaced rollers 11, 12. In the illustrated apparatus, it will be assumed that the roller 11 is driven by any suitable means (not shown) and that the roller 12 is an idler. It will be understood, however, that it is generally immaterial which of the rollers is driven. It will also be understood that, while the illustrated belt system incorporates only a pair of spaced rollers, any number of rollers may be used, depending on the nature of the belt system.

The roller 11 of the illustrated apparatus may be mounted in suitable normally fixed bearings (not shown). The roller 12, however, has its shaft 13 mounted in spaced bearings 14, 15 adapted for limited movement in the longitudinal direction of the axis of the belt, in guideways 16, 17. The bearings 14, 15 are advantageously of a self-aligning type, permitting the roller shaft 13 to become tilted or skewed with respect to the belt axis without binding in the bearings. In the embodiment of the invention illustrated, the bearings 14, 15 are connected to tensioning members 18, 19, which can urge the shaft 13 in a direction to apply any desired pressure on the belt. The members 18, 19 may take the form of hydraulic cylinders, adjustable springs, or the like. Thus, where the members 18, 19 comprise hydraulic cylinders or adjustable spring devices, belt tension may be regulated by varying the hydraulic pressure applied to the cylinders or the compression in the spring devices.

It is contemplated that the training mechanism of the invention may be used in combination with a belt system in which the belt is placed under substantial tension (in excess of 85,000 p.s.i., for example). Accordingly, when the belt 10 tends to wander to one side or the other of the system, an immediate and accurate correction may be required. To this end, the apparatus of the invention incorporates a pair of double-acting fluid actuators 20, 21 which may be energized to tilt the roller 12 in response to mis-alignment of the belt 10 to cause the belt to return to a centered position in the system.

As will be observed in Fig. 1, the fluid actuators 20, 21 comprise cylinders 22, 23 and pistons 24, 25. The cylinders 22, 23 are mounted in fixed relation to the belt system, by means of suitable brackets 26, 27 secured to the frame structure of the system. The pistons 24, 25 are connected at their forward ends by rods directly to the bearings 14, 15, as shown in Fig. 1, or to the shaft, as shown in Figs. 2 and 3, and have rod portions projecting rearwardly from the cylinders 22, 23, whereby the fluid chambers defined at the opposite ends of the cylinders are of equal effective size. A conduit 28 connects the forward chamber of actuator 20 with the rearward chamber of actuator 21. A second conduit 29 connects the rearward chamber of actuator 20 with the forward chamber of actuator 21. Conduits 28, 29 are in turn connected through conduits 30, 31, respectively, to a four-way fluid valve 32 of a more or less conventional type.

In the illustrated system, the valve 32 has a cylinder 33 in which are mounted piston valve members 34 and 35 on valve rod 36. When the valve members 34, 35 are in a neutral or centered position, the space between them is isolated from conduits 30, 31, but is supplied with fluid under pressure from a source 37 through a conduit 38. The cylinder 33 also includes chambers at the opposite ends of the valve members 34, 35 and, when the valve members are in their normal positions, the conduits 30, 31 are in communication with a sump 39 through the end chambers of the valve and fluid under pressure is not applied to actuators 20, 21.

For actuating the control valve 32, the rod 36 thereof is provided with a roller 40 at its outer end, which is adapted to engage a side edge portion of the belt 10. The rod 36 is resiliently urged in the direction of the belt edge by a spring 41 or other suitable means, whereby to maintain the roller 40 in engagement with the belt edge at all times.

Referring now particularly to the schematic illustrations of Figs. 2 and 3, Fig. 2 illustrates the training mechanism when the belt 10 is moving in a centered position on the rollers of the belt system, in the manner desired. When the system is in this position the valve members 34, 35 of the control valve are held in their centered or neutral positions by the roller 40 maintained in contact with belt 10 by the spring 41.

If, during operation of the belt system, the belt should wander to the left side of the system, as shown in Fig. 3, the roller 40 will follow the belt edge, causing the valve members 34, 35 to be shifted to the left, connecting conduits 31 and 29 through the space between the valve members to pipe 38 which is supplied with pressure fluid from the source 37. This causes the pressure fluid to enter the rearward chamber of actuator 20 and the forward chamber of actuator 21. Bearing 14 is thereby shifted forwardly an amount determined by the volume of fluid entering the actuator 20, while the opposite bearing 15 is retracted a substantially equal amount.

When pressure fluid is caused to enter the actuators 20, 21 in the manner described, the roller 12 is caused to tilt or skew on its shaft about a point located between its ends. This will cause a slight increase in belt tension at the left side of the belt, as viewed in Fig. 3, and a corresponding decrease in tension at the opposite side of the belt, the overall working tension of the belt remaining substantially the same, as will be understood. Moreover, the slight increase in tension at one side of the belt may be compensated for, where desired, by providing a slight crown on the surface of the roller 12.

In the illustrated belt system, where the belt 10 is a wide steel band and is maintained under great tension, tilting of the roller 12 will cause the belt to return toward the low tension side of the roller 12, tending to return the belt to its original centered position.

As the belt 10 returns toward its center position, after tilting of the roller 12, the valve rod 36 and members 34, 35 are gradually returned to their normal centered positions. When the rod 36 reaches its neutral position, as shown in Fig. 2, the conduits 29, 31 are connected through the valve 32 to the sump 39 and pressure is released from the fluid actuators 20, 21. When the belt is in this position the bearings 14, 15 are in their normal positions, i.e., parallel to the shaft of roller 11.

It will be understood, of course, that if the belt wanders off center to the right, as viewed in Fig. 3, the valve rod 36 will shift in the opposite direction to tilt the roller 12 in a direction to return the belt to the left, toward the center position.

The training mechanism of the present invention has particularly advantageous application in belt systems utilizing wide flat steel belts maintained under substantial tension. Where such belts are under a high initial tension, it is important that the training mechansm does not substantially increase the belt tension during correction of the belt position. With the apparatus of the present invention, the movable roller has primary support means normally supporting the roller in such a manner as to maintain normal tension in the belt. The new mechanism acts on the roller in a manner such that the normal supporting force is reduced at one side and correspondingly increased at the opposite side to adjust the position of the belt. Accordingly, the overall tension in the belt remains substantially the same.

As will be readily understood, the apparatus of the invention is of a relatively uncomplicated nature and may be incorporated in most belt systems without difficulty. It has been found that the new mechanism is effective in maintaining a high-tension belt centered within one-sixteenth inch in the belt system. The training mechanism is economical in operation, since the entire mechanism is inert or unenergized as long as the belt remains properly centered in the belt system. The mechanism is also inherently anti-hunting, since when the plunger is returned to its center position, as the belt position is corrected, the pressure is immediately released from the fluid actuators, permitting the movable roll to return to its initial position.

I claim:

1. In combination with a belt system of the type including at least two spaced generally parallel rollers, an endless belt trained about said rollers, and means for movably supporting one of said rollers on a shaft; a belt training mechanism comprising two fluid actuators each being in operative connection with one end of the shaft of said one roller, said fluid actuators each comprising a cylinder and a piston and having opposed cylinder chambers on opposite sides of the piston, conduits for fluid under pressure cross-connecting the chambers of one actuator with the opposite chambers of the other actuator, and valve means in connection with and actuated by said belt, said valve means being responsive to the mis-alignment of said belt on said rollers to control the introduction of fluid into said conduits and chambers and skew said shaft about a point intermediate its ends without changing the tension on the belt, and hydraulic means for applying pressure on said shaft independently of said fluid actuators to maintain said belt under operating tension.

2. The apparatus of claim 1, further characterized by said valve means comprising a valve normally connecting said conduits to exhaust, and valve actuating means engaging a side edge of said belt and adapted to actuate the valve means to direct fluid under pressure into certain of said conduits upon said belt shifting transversely of its normal path between said rollers.

3. The apparatus of claim 2, further characterized by said valve actuating means comprising a roller adapted to engage an edge of said belt during its movements, and resilient means to maintain said roller in contact with said edge.

4. In combination with a belt system of the type including at least two spaced generally parallel rollers, an endless belt trained about said rollers, means to maintain said belt under tension, and means for movably supporting one of said rollers on a shaft which extends from opposite ends of the roller; a belt training mechanism comprising actuator means acting on the shaft for said one roller at opposite ends of the roller, movable bearing means for each end of said shaft for skewing the shaft in a plane generally parallel to the longitudinal axis of the belt, and control means operative in response to the mis-alignment of said belt on said rollers to energize said actuator means for skewing said one roller about a point intermediate its ends without substantially altering the tension on said belt.

5. The apparatus of claim 4, further characterized by said actuator means comprising separate actuator devices acting on the shaft for said one roller at opposite ends thereof and adapted to shift the roller ends in directions generally parallel with the longitudinal axis of said belt, said control means being operative when activated to energize said actuator devices for movement in opposite directions.

6. The apparatus of claim 5, further characterized by said actuator devices comprising fluid actuators, and said control means including a four-way valve, said four-way valve having valve members adapted when shifted from a neutral position to direct fluid into opposite ends of the respective actuators, said four-way valve being further operative when in a neutral position to release fluid pressure from said actuators.

7. The apparatus of claim 6 including a member resiliently engaging an edge portion of said belt and operatively connected to said four-way valve whereby to operate said valve members in response to movement of said belt transversely of said rollers.

References Cited in the file of this patent

UNITED STATES PATENTS

| | | |
|---|---|---|
| 994,910 | Duesterhoff | June 13, 1911 |
| 1,140,890 | Eloesser | May 25, 1915 |
| 1,309,245 | Coryell | July 8, 1919 |
| 1,982,685 | Muller | Dec. 4, 1934 |
| 2,229,973 | Hormel | Jan. 28, 1941 |

FOREIGN PATENTS

| | | |
|---|---|---|
| 283,349 | Germany | Apr. 12, 1915 |
| 1,119,642 | France | Apr. 3, 1956 |

(Corresponding British Patent 773,500, Apr. 24, 1957.)